Dec. 8, 1925.
T. C. STEIMER
1,564,909
GLASS FEEDING MECHANISM
Original Filed Feb. 12, 1910    3 Sheets-Sheet 1
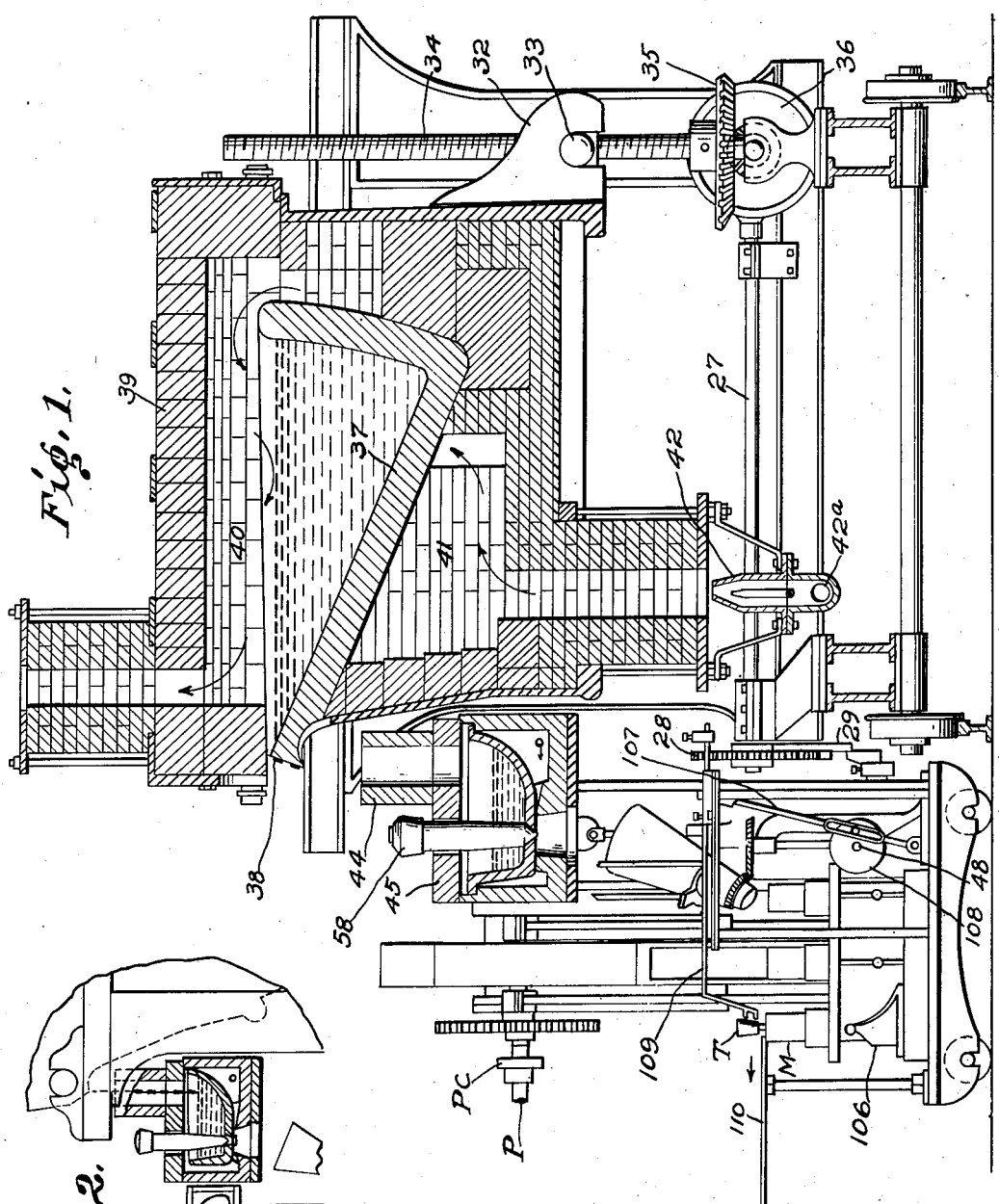
Inventor
Charles M. Steimer
Executor of Theodore C. Steimer
Attorney

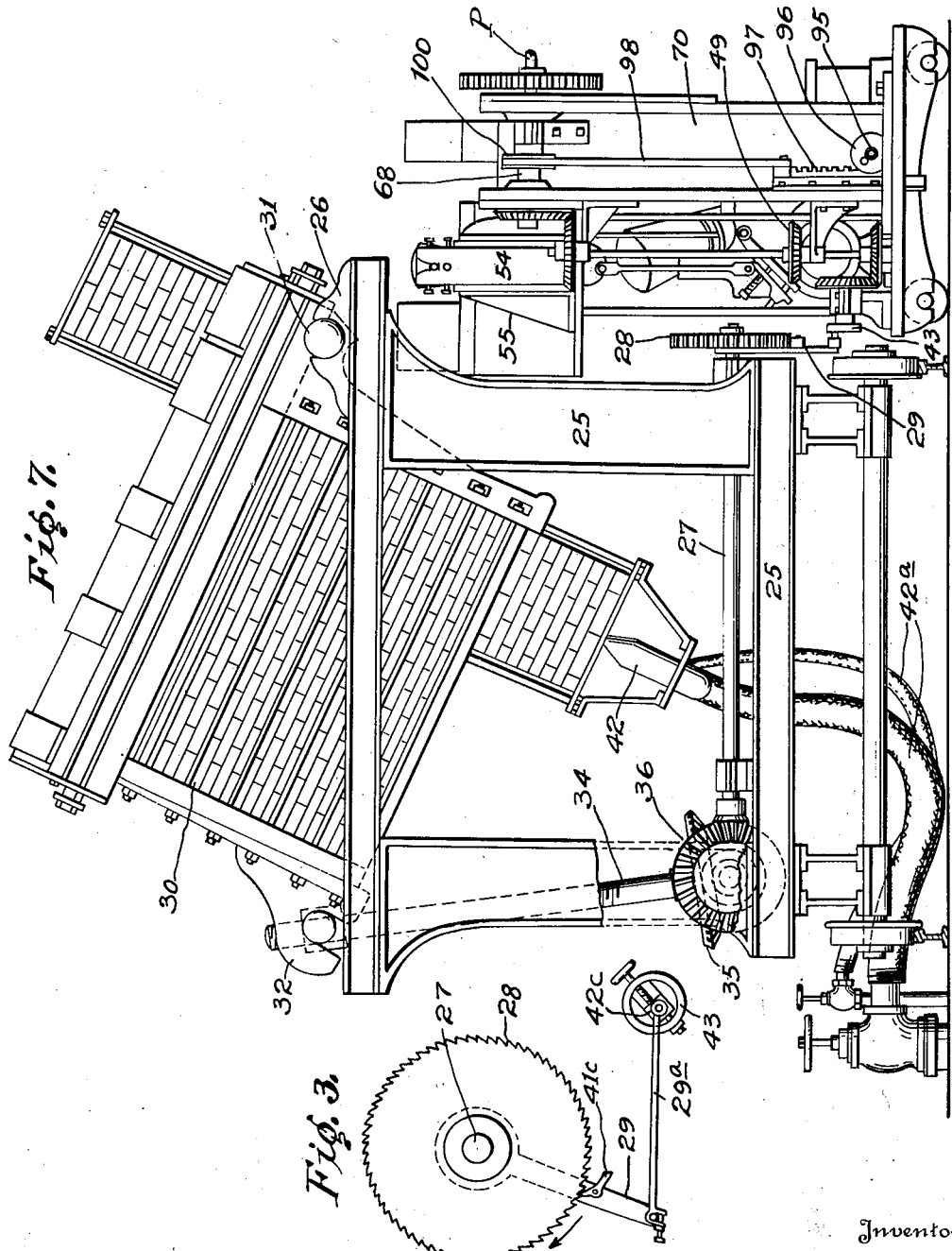

Dec. 8, 1925.

T. C. STEIMER

GLASS FEEDING MECHANISM

Original Filed Feb. 12, 1910    3 Sheets-Sheet 3

1,564,909

Inventor
Charles M. Steimer
Executor of
Theodore C. Steimer
Attorney

Patented Dec. 8, 1925.

1,564,909

UNITED STATES PATENT OFFICE.

THEODORE C. STEIMER, DECEASED, LATE OF PITTSBURGH, PENNSYLVANIA; BY CHARLES M. STEIMER, EXECUTOR, OF ZANESVILLE, OHIO, ASSIGNOR, BY MESNE ASSIGNMENTS, TO HARTFORD-EMPIRE COMPANY, A CORPORATION OF DELAWARE.

GLASS-FEEDING MECHANISM.

Original application filed February 12, 1910, Serial No. 543,582. Divided and this application filed December 31, 1924. Serial No. 759,172.

*To all whom it may concern:*

Be it known that THEODORE C. STEIMER, deceased, a citizen of the United States of America, who resided in the city of Pittsburgh, in the county of Allegheny and State of Pennsylvania, did during his lifetime invent certain new and useful Improvements in Glass-Feeding Mechanism, for which he filed an application in the United States Patent Office, No. 543,582, on the 12th day of February, 1910, of which application this is a divisional filed for the purpose of specifically claiming certain features therein set forth.

The invention herein claimed relates to the art of feeding glass for the manufacture of pressed or blown articles, such as table ware and the like. The primary objects are to provide efficient means for regulating the size and weight of the articles and to provide for continuously feeding charges for pressing or blowing machine molds or blanks, and other specific improvements, which will hereinafter appear.

Referring to the accompanying drawings which are a part of those filed in the original application aforesaid, and which show, in addition to the features herein claimed, certain matters to be claimed in the aforesaid original application, Figure 1 is a central vertical section of a furnace, showing a full charge of molten glass therein, also the delivery pot, as invented by THEODORE C. STEIMER and a side elevation of a suitable pressing machine.

Figure 2 is a diagrammatic side view thereof partly in elevation and partly in section, showing the delivery of a charge of glass.

Figure 3 is a detail of mechanism for operating the tilting of the furnace.

Figure 7 is a side elevation of the melting and pouring furnace, tilted in position to entirely empty its charge, showing also parts of the pressing machine.

Figure 4:
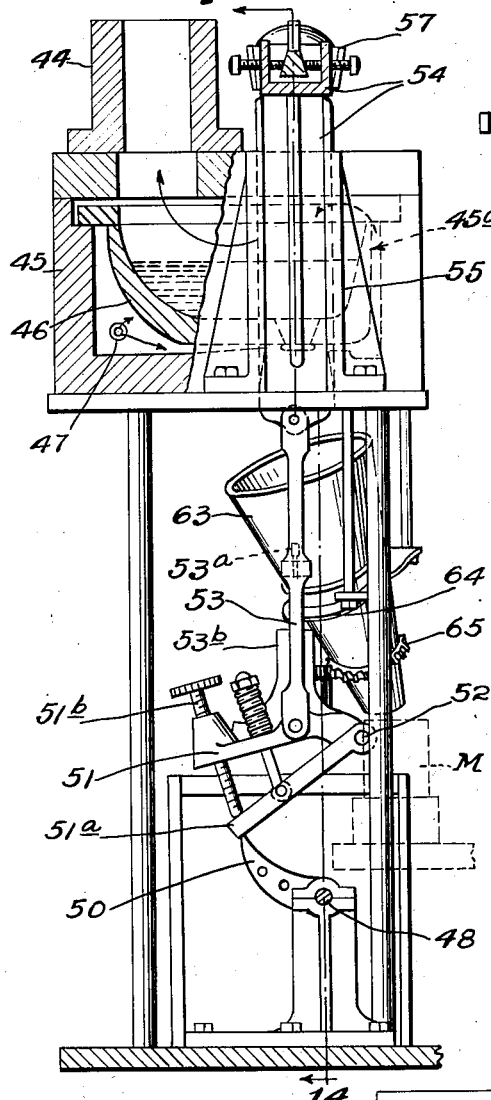
Figure 4 is a partial side elevation and a partial section showing the mechanism for measuring the glass and feeding the molds, the section being taken partly on the line (13) in Figure 5.

First, to briefly explain the general nature of the invention, I refer to the drawings wherein I present an apparatus including a melting and delivering furnace 30 which is pivoted at 31 and pours out the glass constantly at a fixed head. The glass flows in an unbroken stream into the interrupter chamber 45, where, by means of a reciprocating plunger 58 it is divided up into charges which are delivered through the funnel 63 into a series of molds M, where each charge of glass is automatically pressed and delivered as shown at T in completed form.

On a frame 25 of any suitable construction, I provide a stationary bearing 26 and a movable bearing 32 to carry the furnace. All the operations necessary to move the furnace are provided for by a shaft 27 driven by a gear 28 and ratchet arm 29 shown in detail in Figure 3 and hereafter described. It is sufficient at this point to say, that the furnace may be entirely removed by merely disconnecting the air and gas pipes in the usual way, and lifting the driving link 29ª off of its connecting pin on the arm 29. The furnace 30 may be built in any usual construction of iron framing and the outside casing is as customary; but the entire frame and casing are supported on the fixed trunnions 31 at the front of the furnace, and bearing 32 at the rear of the furnace engaging a movable trunnioned nut 33 riding on a pivoted screw 34 which has a bearing in the frame 25 and is rotated slowly and intermittently by gearing 35 and 36 from the shaft 27.

The interior construction of the furnace is peculiar; the melting pot 37 as seen in Figure 1 is of wedge shape, with vertical sides, so that as the furnace is tipped about its pivoting point which corresponds with the line of the pouring mouth 38, the glass is always poured from the same level and from exactly the same position in the furnace. That is, the pouring point is immovable and the whole body of the glass moves around it as a center. By this means I am enabled to drain off the entire charge of glass, leaving no residue to mix with a new charge, which would be very detrimental. The raw material for the glass may be introduced by lifting off the top 39. It will be observed that the pot 37 is in a reverberatory chamber formed by the passages 40 and 41, being heated in any convenient way, as by the air and gas burner 42 fed by any convenient form of piping 42$^a$.

The pouring of the glass from the furnace 30, accomplished by the slow revolution of shaft 27 and screw 34, is brought about by the reciprocating movement of arm 29, which as will be seen in Figure 3 is provided with a dog or ratchet 41$^c$, moved intermittently and moved any desired distance to regulate the flow of glass, by means of link 29$^a$ engaging an adjustable wrist-pin 42$^c$ set in a revolving wheel 43, geared up as will be obvious from Figure 7, with the main power shaft P. That is, by attachment to a continually rotating element, the dog and circular rack just described will slowly and continuously tip the furnace about its pouring spout as an axis, so as to deliver a continuous stream of glass at the exact rate required. The adjustment is made without stopping the machine. The glass is always under the same conditions of temperature, pressure head, movement, etc., and the entire charge of the furnace is used up.

Figure 5:
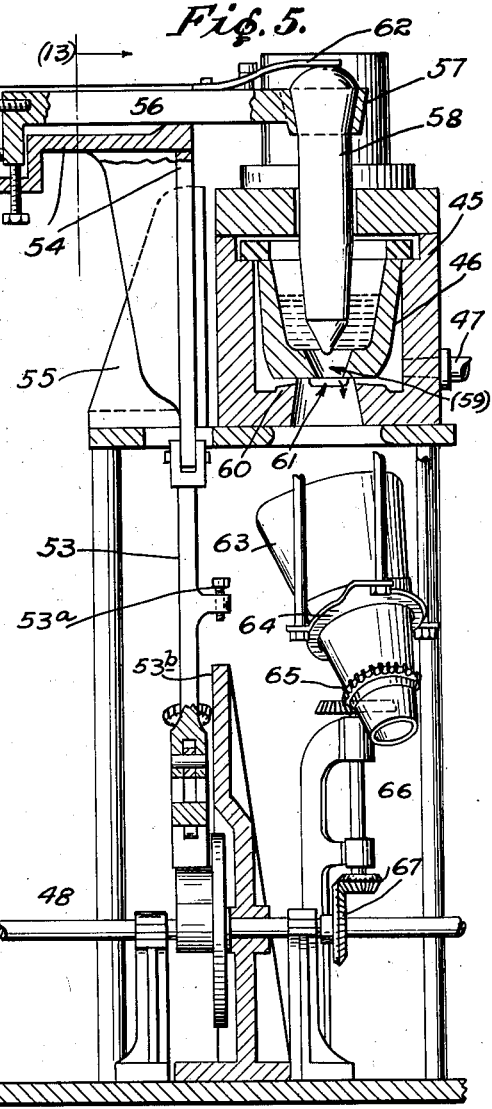
Figure 5 is a section on the line (14) of Figure 4, and elevation of a different view of the same mechanism.
Figure 6:
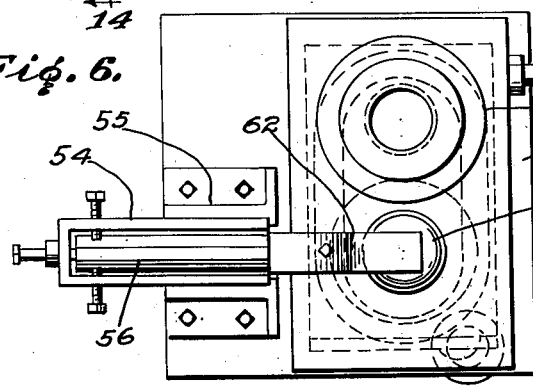
Figure 6 is a plan view of the glass measuring and feeding pot.

The stream of glass, protected by the hood 44 flows into the interrupter chamber 45 shown in detail in Figures 1, 4, 5 and 6. This chamber 45 has the double purpose of housing the regulating pot and plunger, and of keeping the glass uniformly at the correct temperature. Inside the chamber 45, I provide a pot 46 having the peculiar form shown in Figs. 4 and 5, so that a gas flame introduced thereunder by a burner 47 reverberates around the pot 46 and at the same time assists the plunger in its functions as hereafter described. Referring to Figs. 4 and 5 especially, it will be understood that the shaft 48 may be connected up as by a gear 49 at the right of Figure 7, with the main power shaft P; and on the shaft 48 is a cam 50 which reciprocates an arm 51 pivoted at 52 to any convenient part of the frame of the machine. This arm 51 has a bearing portion 51$^a$ which is adjustable in position by screw 51$^b$ so as to regulate the throw of the connected vertical reciprocating link 53, imparting motion to a frame 54 which slides in a vertical guide 55. On this frame the plunger is mounted with various adjustments as shown, by means of the supporting arm 56 having a ring 57 to hold the plunger 58. This plunger has a conical end which just fits a conical outlet 59 in the pot 46, so that when the plunger is down it approaches closer to the surface of the opening 59 and stops the flow of glass through the same. It will be understood that the downward motion of this plunger 58 ends at a fixed position which may be regulated by screw 53$^a$ on the link 53 striking a projection 53$^b$ on the frame of the machine. It will be noted that though positively raised by arm 56, the plunger may fall immediately by gravity when the cam 50 escapes, so that it is governed by the conditions of the glass.

The pot 46 is seated on an upwardly projecting boss 60 in the chamber 45, and this boss is provided with several radial slots 61 through which a fine flame constantly plays immediately under the outlet of the opening 59. The several jets of flame are projected toward a common center and have the effect of completely melting and cutting off the charge of glass delivered by the rising and falling of the plunger 58. It will be understood that the volume of this flame is sufficiently large to give a strong blast for this purpose as well as to reverberate on top of the pot 46, through the opening 45$^a$ shown in dotted lines in Fig. 4. The plunger 52 is held in the head 57 by a leaf spring 62. The amount of glass flowing into the pot 46 being carefully regulated and entering in regular pulsations, the motions of the plunger 58 are timed correspondingly and carefully adjusted in extent so that the same amount of glass which flows into the pot 46, also flows out each time the plunger is lifted to supply the molds. Thus the level of glass in the pot remains constant, which means that the head or pressure at the outlet is always the same, and the temperature conditions being also constant, the same charge of glass at the same consistency is invariably fed to the molds. According to the size of the article being made, the rate of flow of glass is easily regulated by adjusting the position of the wrist pin 42 (Fig. 3), and the position of the bearing arm 51$^a$ in Figure 4.

Of course, the glass from the interrupter may be fed directly into the mold when desired, but I have illustrated in Figs. 4 and 5 an improvement which consists in a conical chute 63 mounted in the frame 64 so as to revolve freely and carrying a gear 65 which is driven through shaft 66 by gear 67 on the shaft 48. This cone stands over the momentary position of the mold M in its place on the press.

Briefly the operation of the apparatus is as follows:

The glass having been properly mixed and melted in the combined melting and pouring furnace pot 37, it will be understood that the glass flows in a continuous stream through the spout 38 into an interrupter chamber. Although the screw 34 tilting the furnace has an intermittent step-by-step movement, there is a very slow movement and the changes of positions are so small that they do not interrupt the continuity of the outpouring stream. The machines are so timed that the lifting of the plunger 58 practically corresponds with the pulsation of the flowing stream maintaining the constant glass level in the pot 46. This plunger 58 rising at the proper time allows a flow through the outlet 59 and then stops the flow by constricting the passage and meanwhile the constantly playing flame in the slots 61 separates the issued glass. The issued glass is delivered by the revolving cone 63 to the mold M, which happens to be placed thereunder. The plunger is geared up to the press and consequently the motions are exact and the amount of glass is exactly measured off to suit the molds being used.

The invention to be protected hereby is for a sub-combination in the glass feeding art of the hereinafter specified means for controlling the issue of glass from a feeder and is independent of the specific means employed to completely separate the issued glass from the glass in the feeder, and furthermore is limited to means for adjusting the nearest position of the plunger to the outlet, either, while the plunger is moving, or, without changing the position of the plunger remote from the orifice, as claims broadly on a non-seating plunger, claims directed to varying the lift of the plunger and claims directed to the mounting of the plunger and claims including elements other than the container with the outlet and the plunger with its drive and control mechanism are made in the said original application or other divisions thereof.

What is claimed as the invention of THEODORE C. STEIMER is:

1. Apparatus for separating molten glass into mold charges, including a container for the glass having an outlet, an implement projecting into the glass toward the outlet and mounted for movement toward and from the outlet, means for periodically moving said implement toward and from the outlet and means for adjusting the nearest position of said implement to the outlet without changing its position remote from such outlet.

2. The combination with a container for molten glass having an outlet, of means adapted to be projected into and withdrawn from said outlet, operating means for periodically projecting said first-named means into said outlet, and means for adjusting the extent of projection into said outlet while the first named means are moving.

3. The combination with a container for molten glass having an outlet, of means adapted to be projected into and withdrawn from said outlet while out of contact therewith, operating means for periodically projecting said first-named means into said outlet, and means for adjusting the extent of projection into said outlet during the operation of said operating means.

4. Apparatus for separating molten glass into mold charges, including a container for the glass having an outlet, an implement projecting into the glass toward the outlet and mounted for movement toward and from the outlet, means for periodically moving said implement toward and from the outlet, and means operable while the apparatus is in operation for adjusting the nearest position of said implement to the outlet.

5. In an apparatus for separating molten glass into mold charges, the combination of a container for the glass having an outlet, an implement projecting into the glass towards the outlet and mounted for movement towards and from the outlet, driving means for imparting such movement to said implement and operatively connected therewith, and means operable for adjusting the nearest position of said implement to the outlet while the driving connection subsists.

6. In an apparatus of the class described, the combination of a receptacle for molten glass having a submerged outlet, of a member adapted to reciprocate in the glass axially of the outlet and adjacent thereto, means for reciprocating said member, and adjustable means for limiting the movement of the member toward the outlet without changing the range of its movement away from the outlet.

CHARLES M. STEIMER,
*Executor of Theodore C. Steimer, Deceased.*